United States Patent [19]
Inoue et al.

[11] Patent Number: 5,612,227
[45] Date of Patent: Mar. 18, 1997

[54] LIQUID BOUNDARY DETECTING METHOD AND APPARATUS AND LIQUID REMOVING METHOD AND APPARATUS

[75] Inventors: Tsuyoshi Inoue, Kanagawa; Keiichi Nakamachi, Saitama; Takeshi Nakamura, Kanagawa; Kenji Okada, Tokyo, all of Japan

[73] Assignee: Sony Corporation, Japan

[21] Appl. No.: 401,929

[22] Filed: Mar. 9, 1995

[30] Foreign Application Priority Data

Mar. 17, 1994 [JP] Japan .................................. 6-073819

[51] Int. Cl.⁶ .................................................... G01N 1/10
[52] U.S. Cl. ........................ 436/180; 73/37; 73/290 R; 73/864.24; 422/72; 422/100; 436/45; 436/50; 436/54
[58] Field of Search ................................ 436/180, 45, 50, 436/54; 722/72, 100; 73/37, 290 R, 864.11, 864.13, 864.24

[56] References Cited

U.S. PATENT DOCUMENTS

| | | |
|---|---|---|
| 3,894,438 | 7/1975 | Ginsberg . |
| 4,794,085 | 12/1988 | Jessop et al. ............................ 436/54 |
| 4,962,041 | 10/1990 | Roginski ................................. 436/150 |
| 5,013,529 | 5/1991 | Itoh ........................................ 422/100 |
| 5,143,849 | 9/1992 | Barry et al. ............................. 436/50 |
| 5,380,486 | 1/1995 | Anami ..................................... 422/63 |

Primary Examiner—Jill Warden
Assistant Examiner—Jan M. Ludlow
Attorney, Agent, or Firm—Ronald P. Kananen

[57] ABSTRACT

A tube is inserted into a first liquid layer, and an air bubble is generated at a tip opening of the tube. The tube is then moved toward a second liquid layer while retaining the air bubble, and a change in the internal pressure of the tube caused by the air bubble reaching the boundary between the first and second liquid layers is detected. After the tip opening of the tube is raised to the top surface of the first liquid layer, the first liquid is sucked up by the tube while the tube is moved to the position where the pressure change was detected.

16 Claims, 13 Drawing Sheets

LIQUID BOUNDARY DETECTING METHOD AND APPARATUS AND LIQUID REMOVING METHOD AND APPARATUS

BACKGROUND OF THE INVENTION

The present invention relates to a liquid boundary detecting method and apparatus and a liquid removing method and apparatus which are used in removing a first liquid layer from a liquid, such as blood, that is separated into at least the first liquid and a second liquid layer.

It is sometimes necessary to separate an object liquid such as a body liquid, for instance, blood into a first liquid layer and a second liquid layer, and to remove the first liquid layer (supernatant liquid), i.e., serum from the second liquid layer.

To do this, a blood object is placed in a container and, for instance, centrifuged into a first liquid layer and a second liquid layer (two-layer state) that exist in the container. The first liquid layer is an upper liquid layer and the second liquid layer is a lower liquid layer.

Conventionally, to remove the upper liquid layer from the lower liquid layer by sucking up the former, an operator sucks up the upper liquid layer with a syringe or the like while watching the region of the upper liquid layer.

Alternatively, the boundary between the upper liquid layer and the lower liquid layer is detected using ultrasonic waves or light, or by way of current conduction, and an operator removes the upper liquid layer by sucking it up with a syringe etc. to the detected boundary.

However, the former, manual removing operation has the following problems. The operation of extracting an upper liquid layer (supernatant liquid) such as a human body liquid is indispensable in medical examinations, for instance, and the manual removing operation cannot accommodate the amount of tests that has greatly increased in recent years.

Further, in sucking up the upper liquid layer with a tube (also called a tip), the tip portion of the tube may touch and be contaminated by the lower liquid when it comes close to the boundary between the upper and lower liquid layers.

On the other hand, in the method of detecting the liquid boundary, the upper liquid or lower liquid may be changed in quality by application of ultrasonic waves, light, or current.

SUMMARY OF THE INVENTION

The present invention has been made to solve the above problems, and has an object of providing a liquid boundary detecting apparatus and a liquid removing apparatus which can positively remove a first liquid layer from a second liquid layer of an object liquid such as a body liquid without causing contamination nor changing its quality.

According to a first aspect of the invention, an apparatus for detecting a position of a boundary between a first liquid layer and a second liquid layer that is different from the first liquid layer, comprises:

means for generating an air bubble on a prescribed member in the first liquid;

means for moving the prescribed member toward the second liquid layer while the prescribed member keeps retaining the air bubble;

means for detecting a pressure change that occurs when the air bubble reaches the boundary position; and means for detecting the boundary position based on a position of the prescribed member at a time point when the pressure change is detected.

With this constitution, control means detects the boundary position based on a pressure-change representing signal sent from the pressure change detecting means. As a result, the boundary position can automatically be detected before sucking a liquid of the first liquid layer.

According to a second aspect of the invention, an apparatus for removing a first liquid layer from a second liquid layer that is different from the first liquid layer, comprises:

sucking means for generating an air bubble in the first liquid layer, retaining the generated air bubble, and sucking a liquid of the first liquid layer;

means for moving the sucking means:

means for detecting a pressure change within the sucking means; and means for controlling driving of the moving means based on a position of the sucking means at a time point when the pressure change was detected.

Further, the pressure change detecting means detects a first pressure change that occurs when the sucking means enters the first liquid layer from the outside of the first liquid layer, and a second pressure change that occurs when the air bubble retained by the sucking means reaches the second liquid layer from the first liquid layer. The moving means moves the sucking means from a first position that approximately corresponds to a time point when the first pressure change was detected to a second position that approximately corresponds to a time point when the second pressure change was detected during a period when the sucking means sucks the liquid of the first liquid layer.

With this constitution, the control means detects the first position of the sucking means at the time point when the first pressure change occurs and the second position (corresponds to the boundary between the first liquid layer and the second liquid layer) of the sucking means at the time point when the second pressure change occurs, and controls the moving means to move the sucking means from the first position to the second position. As a result, the boundary position can automatically be detected before sucking a liquid of the first liquid layer, and only the liquid of the first liquid layer can be sucked positively while the sucking means is prevented from touching the second liquid layer.

DESCRIPTION OF THE PREFERRED EMBODIMENT

A preferred embodiment of the present invention will be hereinafter described in detail with reference to the accompanying drawings.

Although the preferred embodiment described below includes various limitations that are technically preferable, the scope of the invention is in no way limited to the embodiment unless associated with a statement to the effect that the invention is thereby limited.

Figure 1:
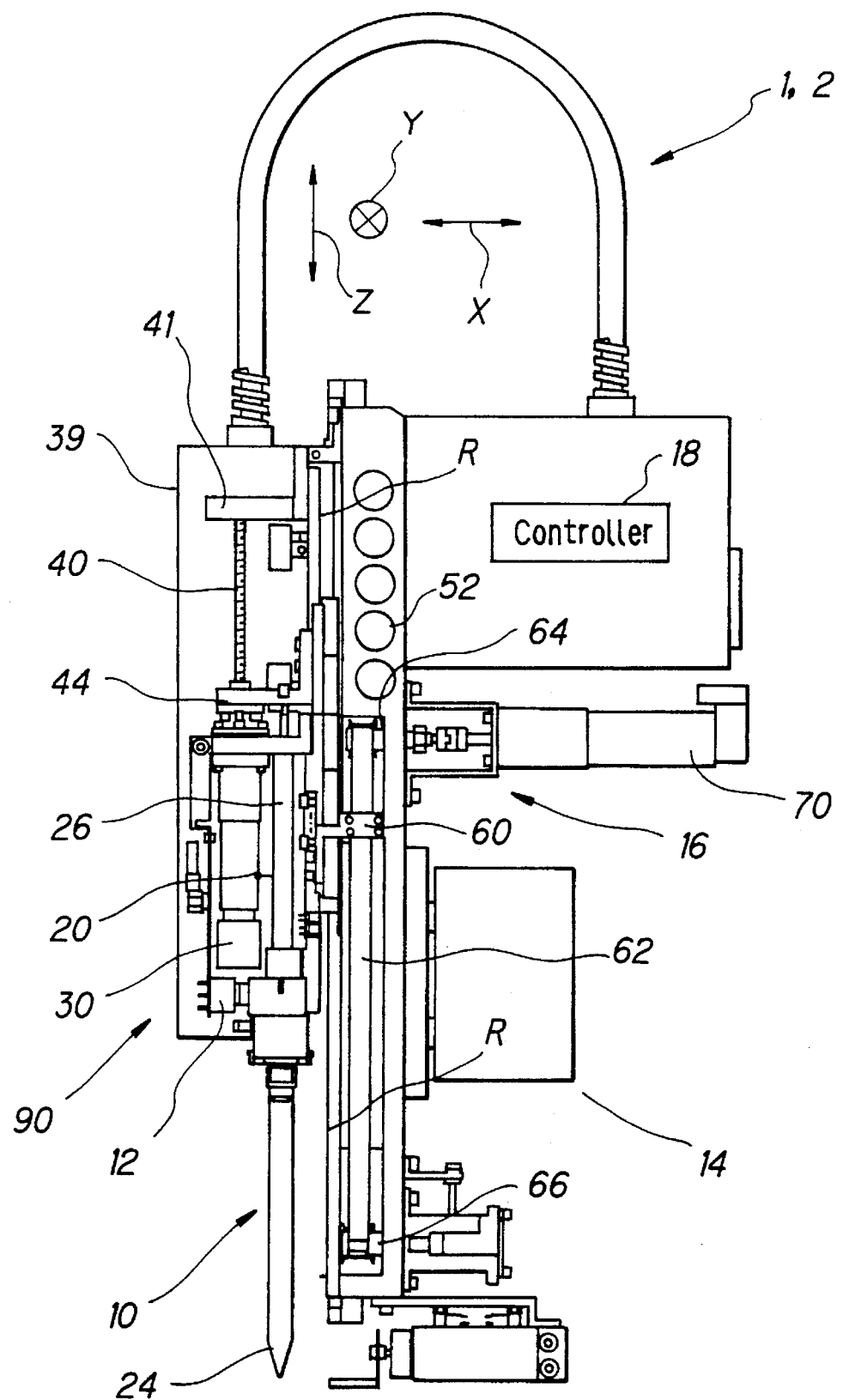
FIG. 1 is a side view of a liquid boundary detecting apparatus and a liquid removing apparatus including it according to a preferred embodiment of the invention.
Figure 2:
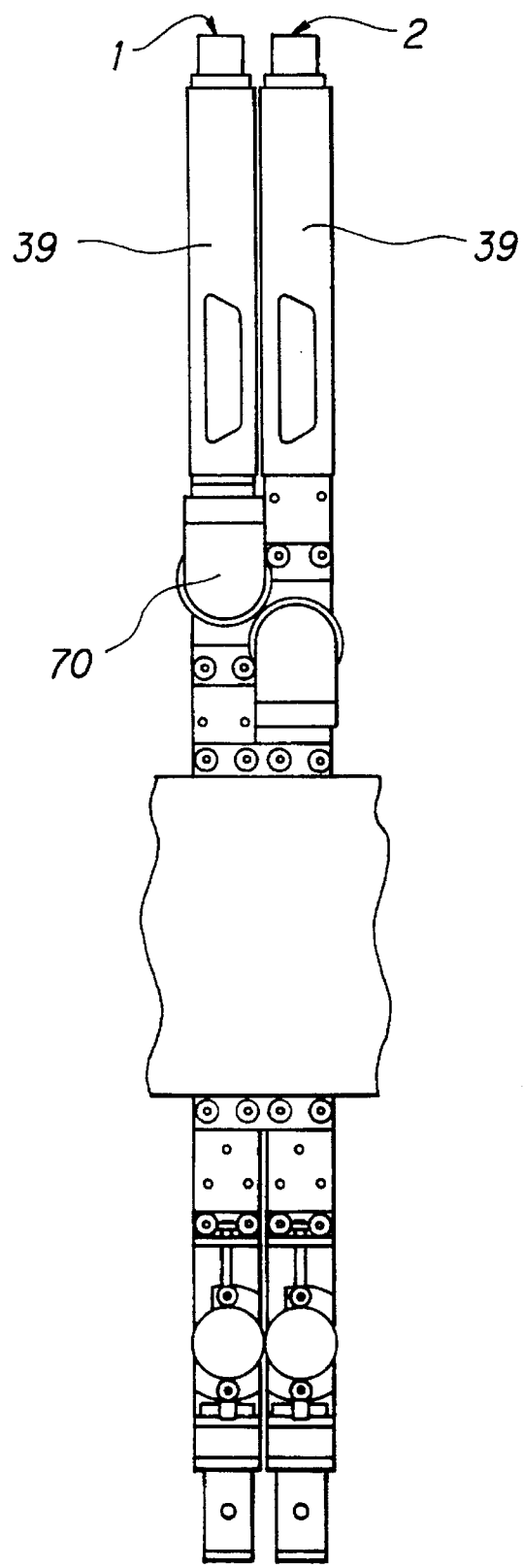
FIGS. 2–4 are a rear view, a front view and a top view, respectively, of the apparatus of FIG. 1.
Figure 3:
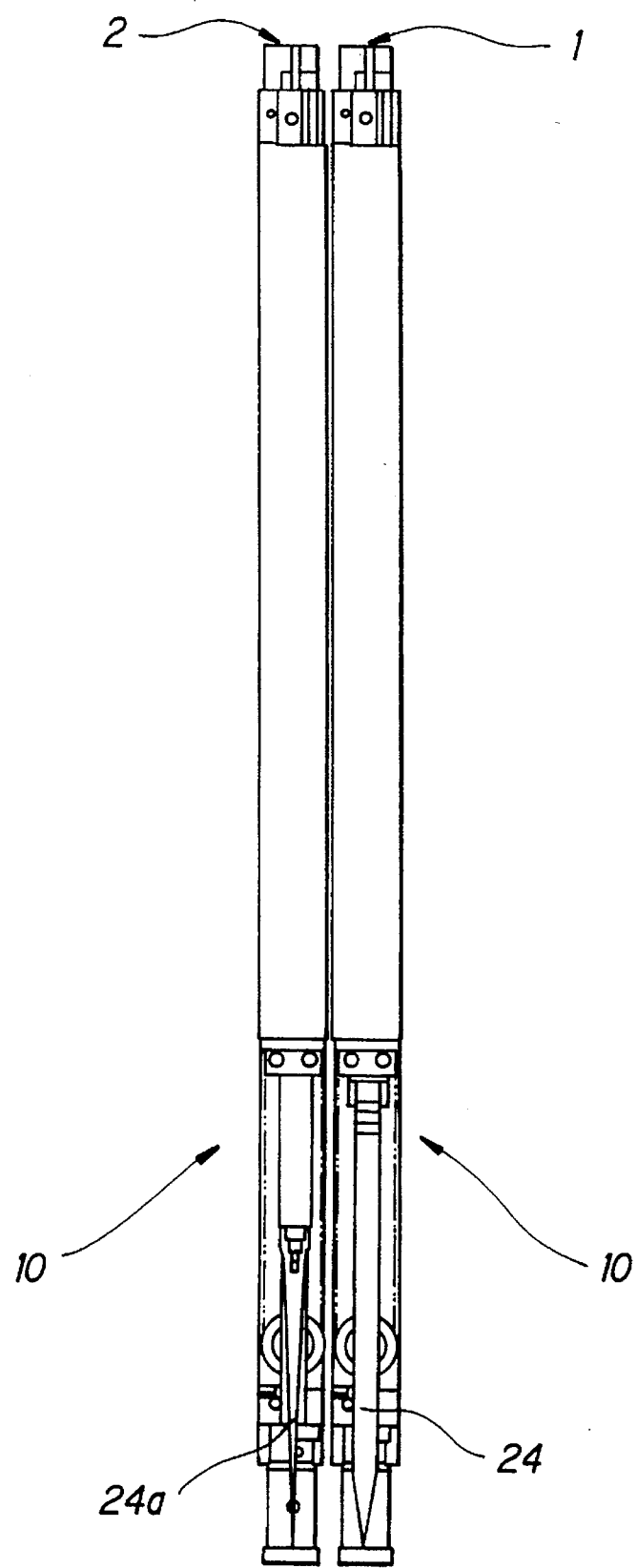
Figure 4:
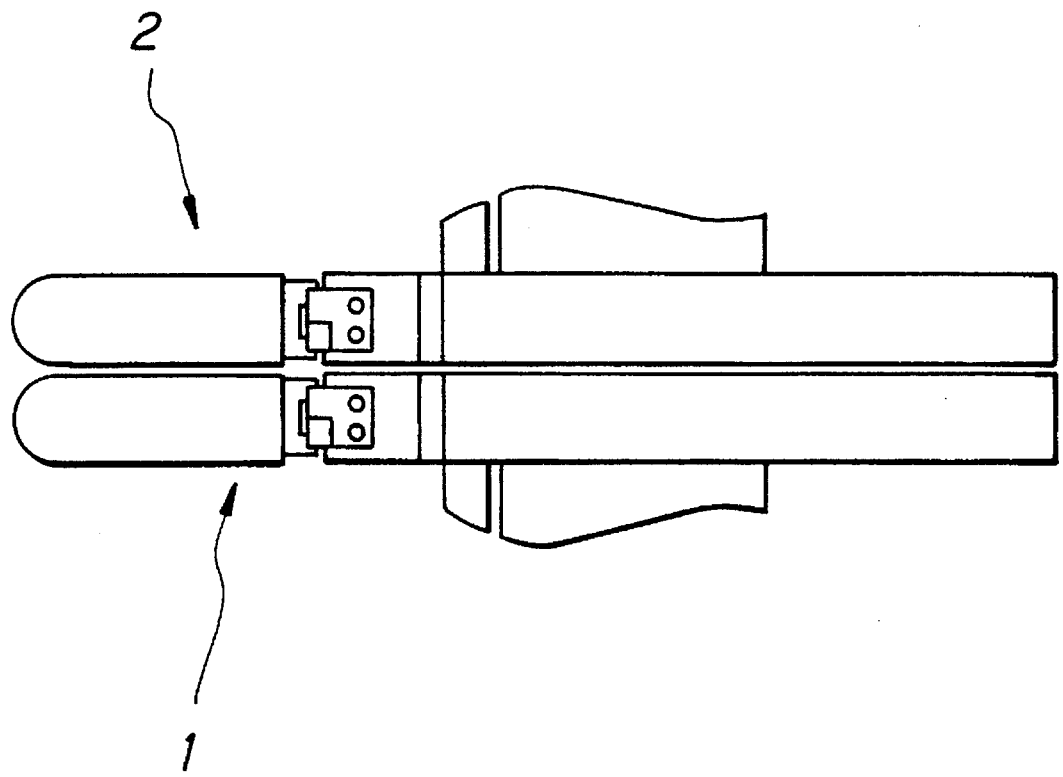
Figure 5:
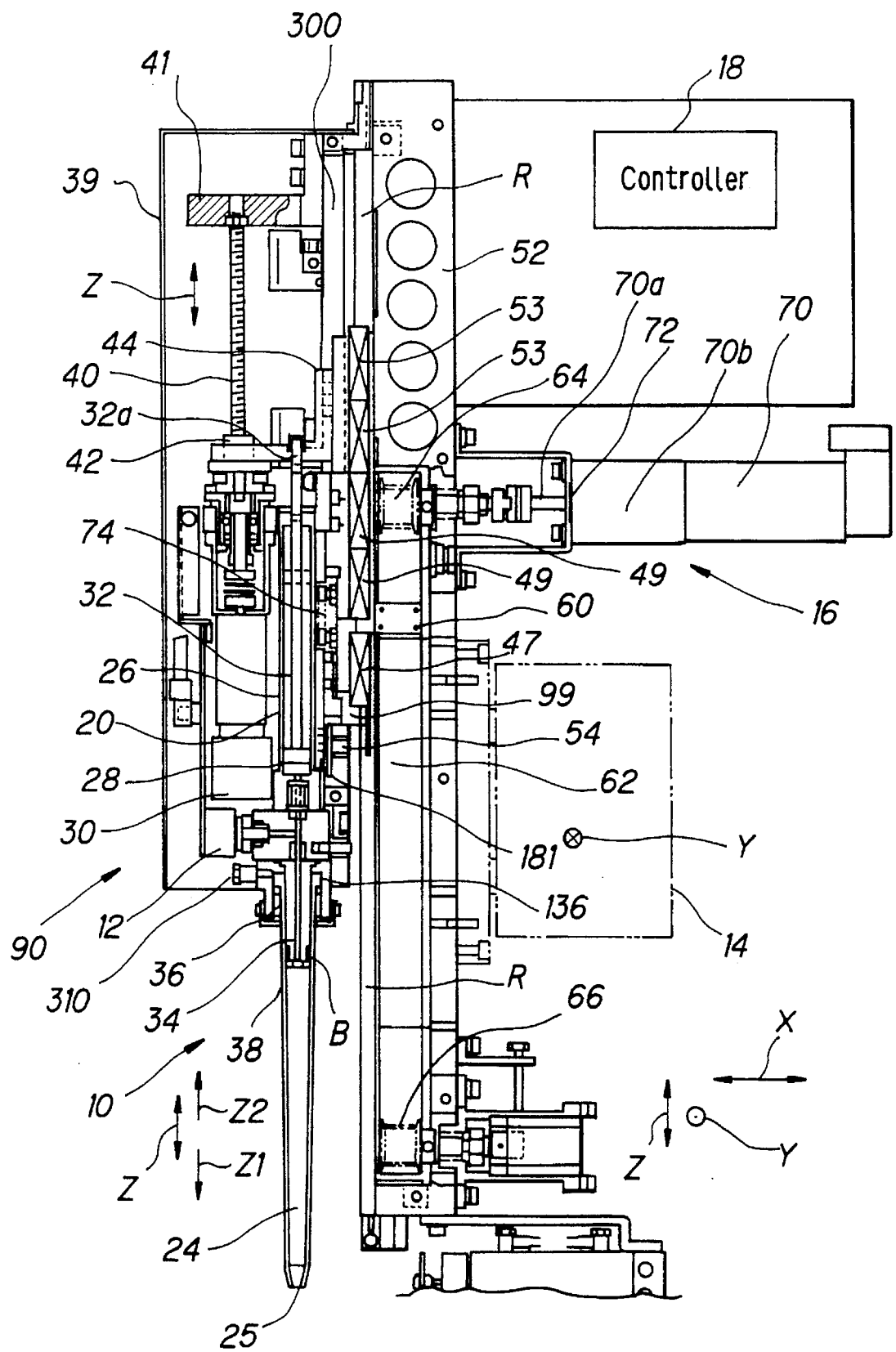
FIG. 5 is an enlarged side view showing the apparatus of FIG. 1 in detail.

FIG. 1 is a side view of a liquid removing apparatus including a liquid boundary detecting apparatus according to a preferred embodiment of the invention. FIGS. 2–4 are a rear view, a front view and a top view, respectively, of the same apparatus. FIG. 5 shows the main part of the same apparatus in detail.

Referring to FIGS. 1–5, a description will be made of liquid removing apparatuses 1 and 2 and a liquid boundary detecting apparatus 90 included in each of the liquid removing apparatuses 1 and 2.

The liquid removing apparatuses 1 and 2, which are also called a separated injector, have the same structure except that tubes 24 and 24a have different shapes as shown in FIG. 3. More specifically, as shown in FIG. 3, the tube 24 of the liquid removing apparatus 1 is thicker than the tube 24a of the liquid removing apparatus 2. One of the tubes 24 and 24a is selected depending on the purpose of using the apparatus.

In the following, the liquid removing apparatus 1 (representing the apparatuses 1 and 2) and its boundary detecting apparatus 90 will be described in detail.

The liquid removing apparatus 1 has a sucking device 10, a pressure sensor 12, a robot 14, a moving device 16, a controller 18, and other components. The liquid boundary detecting apparatus 90 consists of the sucking device 10, the pressure sensor 12, and the controller 18.

Sucking device 10

A description will be made of the sucking device 10.

Referring to FIGS. 1 and 5, the sucking device 10 has a pressure reducing device 20 that also serves as an air bubble generating device, a tube 24, and other parts.

As shown particularly in FIG. 5, the tube 24, which is also called a tip, is a hollow cylinder made of a resin, glass, or the like. The bottom portion of the tube 24 is tapered to form a tip opening 25. The top of the tube is so shaped as to detachably engage a portion on the side of a member 136.

The tube 24 is attached and detached, for instance, in the following manner (see FIG. 5).

When the tube 24 is to be attached, the member 136 is located at the upper position with a spring 36 in an expanded state. In this state, the tube 24 is inserted into a member 34 through an O-ring B. Due to the existence of the O-ring B, the tube 24 is somewhat press-fit in the member 34.

On the other hand, to detach the tube 24, the member 136 is pushed down against the force of the spring 36 by air that is supplied through a joint 310, and the tube is pushed out from the member 34. When the air supply is finished, the spring 36 causes the member 136 to return to the original upper position.

The air bubble generating device 20 also serves as the pressure reducing device. A cylinder 26 of the bubble generating and pressure reducing device 20 has a piston 28 in the inside. The piston 28 is attached to the bottom end of a rod 32. The top end 32a of the rod 32 is fixed to a member 44.

The bottom end portion of the cylinder 26 is connected to an air tube 38, which is disposed inside the member 34. The air tube 38 is connected to the pressure sensor 12 as a pressure detecting device. The member 34 is disposed inside the top portion of the tube 24.

Therefore, the pressure reducing device is effected when the piston 28 in the cylinder 26 is moved in the upward direction (Z2) of arrow Z, and the pressure inside the air tube 38 and the tube 24 is reduced.

Figure 10:
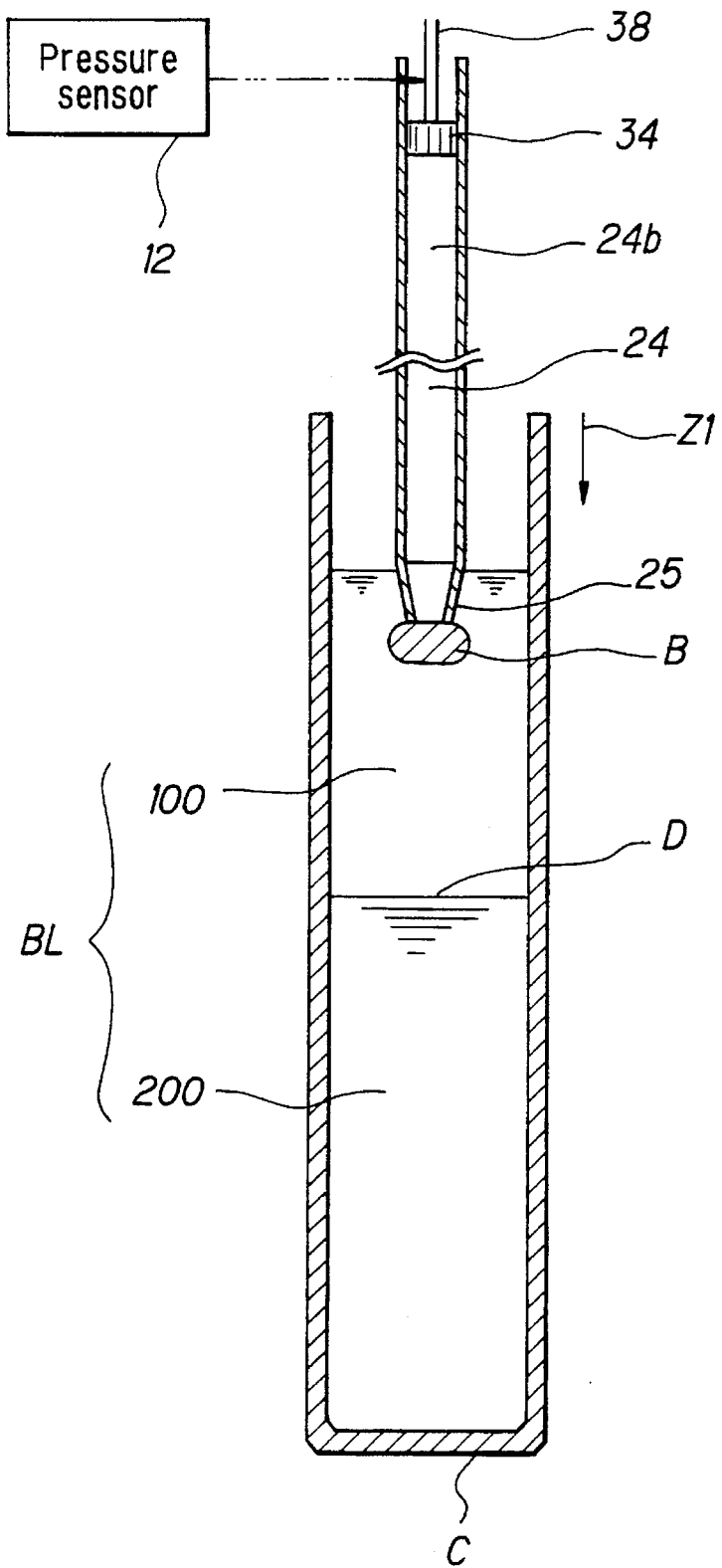
FIG. 10 shows a state in which the tip of the tube is located in the first liquid layer and an air bubble is formed.

On the other hand, the bubble generating device is effected when the piston 28 in the cylinder 26 is moved in the downward direction (Z1) of arrow Z. As shown in FIG. 10, air flows through the air tube 38 and the tube 24, to generate an air bubble B in the tip opening 25 of the tube 24.

The pressure sensor 12 can detect the pressure inside the air tube 38.

Referring to FIG. 5, the member 44 has a nut 42, which engages a ball screw 40. The top end of the ball screw 40 rotatably engages a fixed member 41, and its bottom end is attached to a motor 30, its reduction gears, and other parts.

The fixed member 41 is fixed to a member 300, which is mounted on a base 52 so as to extend along arrow Z, and is integral with second block bodies 49.

With the above configuration, when the ball screw 40 is rotated by the motor 30, the member 44 can be moved in the directions of arrow Z together with the nut 42. As a result, the piston 28 can be moved vertically, i.e., in the directions of arrow Z with respect to the cylinder 26.

A contact-with-obstacle detecting sensor 54 is provided at a portion 181 adjacent to the cylinder 26. For example, the contact-with-obstacle detecting sensor 54 has a structure shown in FIG. 7.

Being what is called an interrupter type sensor, the sensor 54 has a projector portion 54a and a photodetecting portion 54b. When the tube 24 comes into contact with an obstacle such as the bottom of a container to thereby cause an interrupting portion 99 (see FIGS. 5 and 7) to be inserted between the projector portion 54a and the photodetecting portion 54b, the sensor 54 supplies a contact-with-obstacle detection signal S1 to the controller 18 (see FIG. 6).

Detecting the pressure inside the air tube 38, the above-mentioned pressure sensor 12 supplies a pressure signal S2 to the controller 18.

Referring to FIGS. 1 and 5, a head cover 39 is attached to the base 52, and covers the ball screw 40, the actuator 30 (also called the motor), the pressure sensor 12, and other parts.

The interrupting portion 99 (see FIG. 5) is fixed to a first block body 47 (also called a moving block), which is fixed to a fixing member 60.

On the other hand, the second block bodies 49 are integral with the cylinder 26, the motor 30, and other parts. The second block bodies 49 are placed on the first block body 47 through a spring 74.

Further, third block bodies 53 are placed on the second block bodies 49, and fixed to the above-mentioned member 44.

The first block body 47, the second block bodies 49 and the third block bodies 53 are movable along a straight rail (also called a linear rail) R, i.e., in the directions of arrow Z.

The straight rail R is fixed to the base 52 so as to extend along arrow Z, i.e., vertically. The first block body 47 and the second block bodies 49 can move separately. Further, the second block bodies can move in the directions of arrow Z separately from the third block bodies 53.

The robot 14 (see FIG. 5) is a device which can move and position the entire components including the sucking device 10 and the moving device 16 in the directions of arrows Y (perpendicular to the paper surface of FIG. 5).

Moving device 16

A description will be made of the moving device 16.

The moving device 16 serves to move the sucking device 10 and other components in the directions of arrow Z, i.e., vertically.

Referring to FIG. 5, a motor 70 of the moving device 16 is mounted on the base 52 via a bracket 72. A shaft 70a of reduction gears 70b is connected to a pulley 64, which is located at an upper position. Another pulley 66 is located at a lower position.

An endless power transmission member such as a timing belt 62 is applied to the pulleys 64 and 66. The fixing member 60 is fixed to the belt 62. By rotating the motor 70 normally or reversely, the fixing member 60 and the first block body 47 can be moved upward or downward, i.e., in the directions of arrow Z along the straight rail R.

Figure 6:
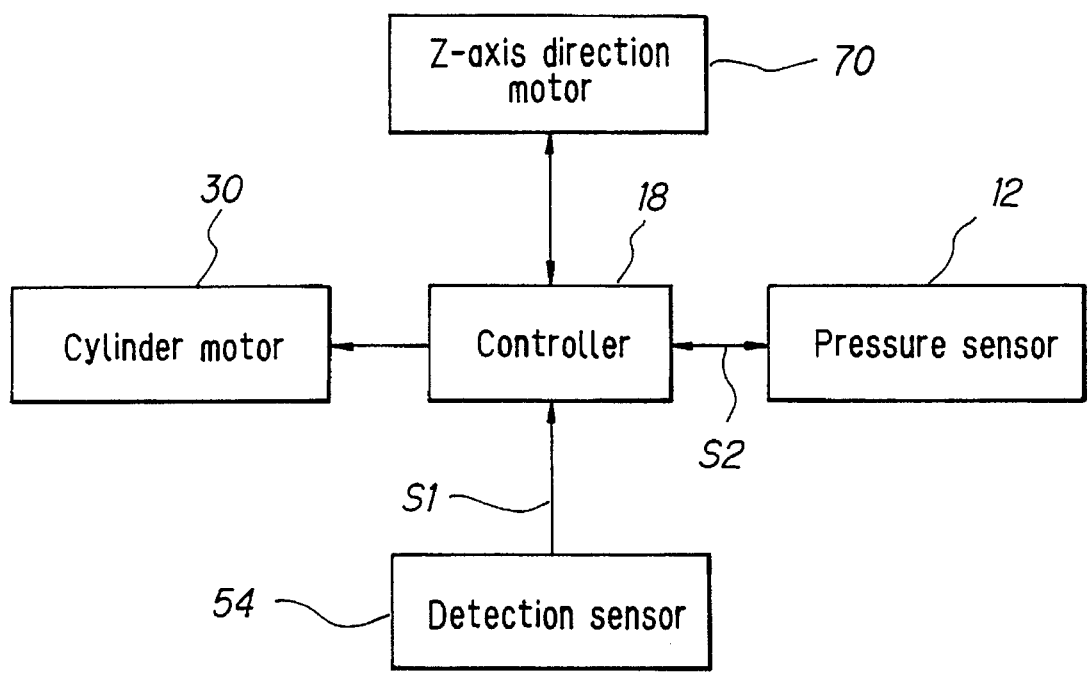
FIG. 6 is a block diagram showing how a controller is connected to control objects and sensors.

Referring to FIG. 6, the controller 18 is connected to the Z-axis direction motor 70 and the cylinder motor 30, and supplies drive signals to the respective motors. The robot 14 (see FIG. 5) is controlled by a separate controller.

Figure 14:
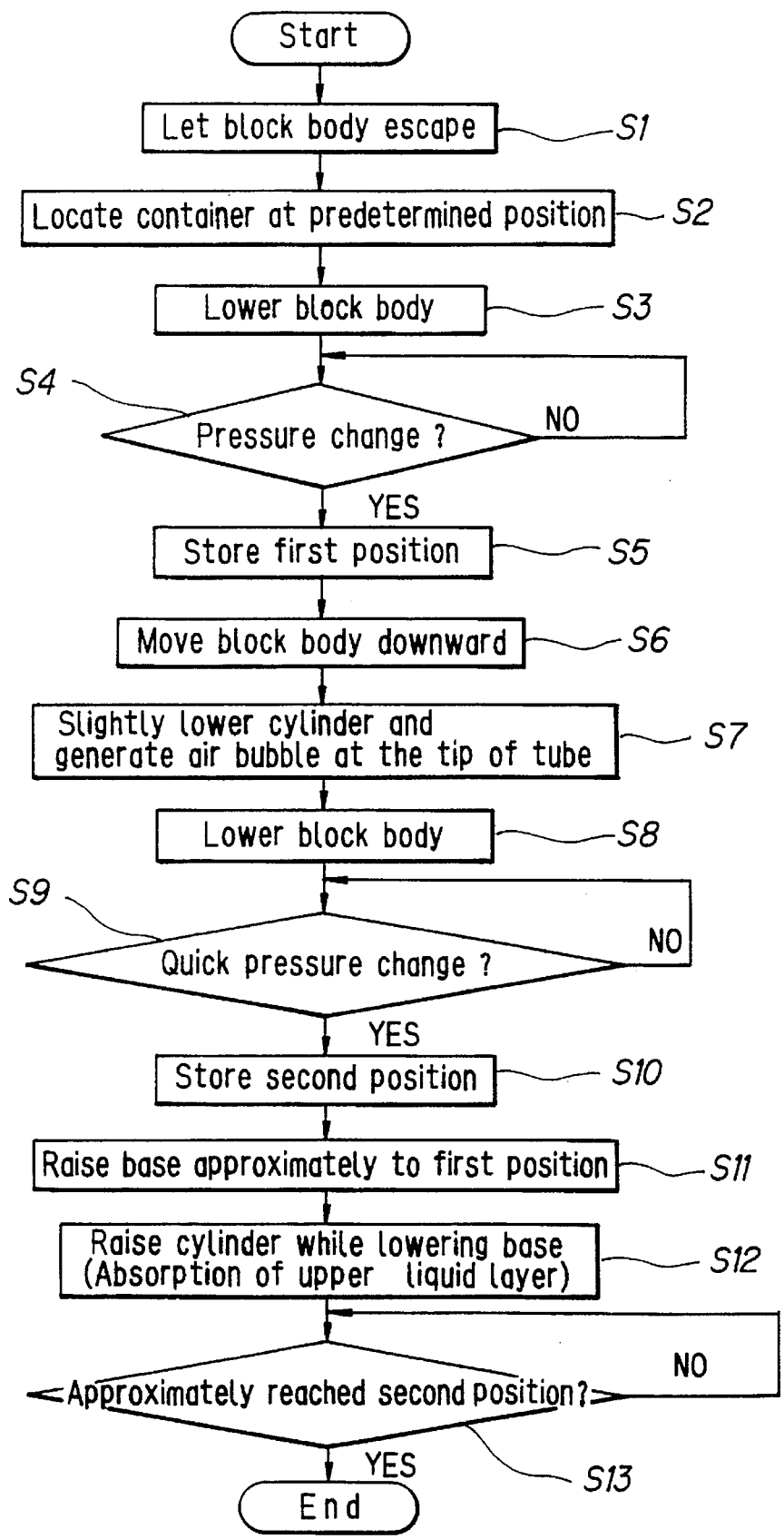
FIG. 14 is a flowchart showing processes of liquid boundary detection and liquid removal.

Next, referring to FIG. 14, there will be described a method for removing a supernatant liquid such as serum from a body liquid such as blood by using the removing apparatuses 1 and 2 that include the liquid boundary detecting apparatus 90 shown in FIGS. 1–7, and a method for detecting a liquid boundary surface D of a liquid by using the liquid boundary detecting apparatus 90.

Figure 8:
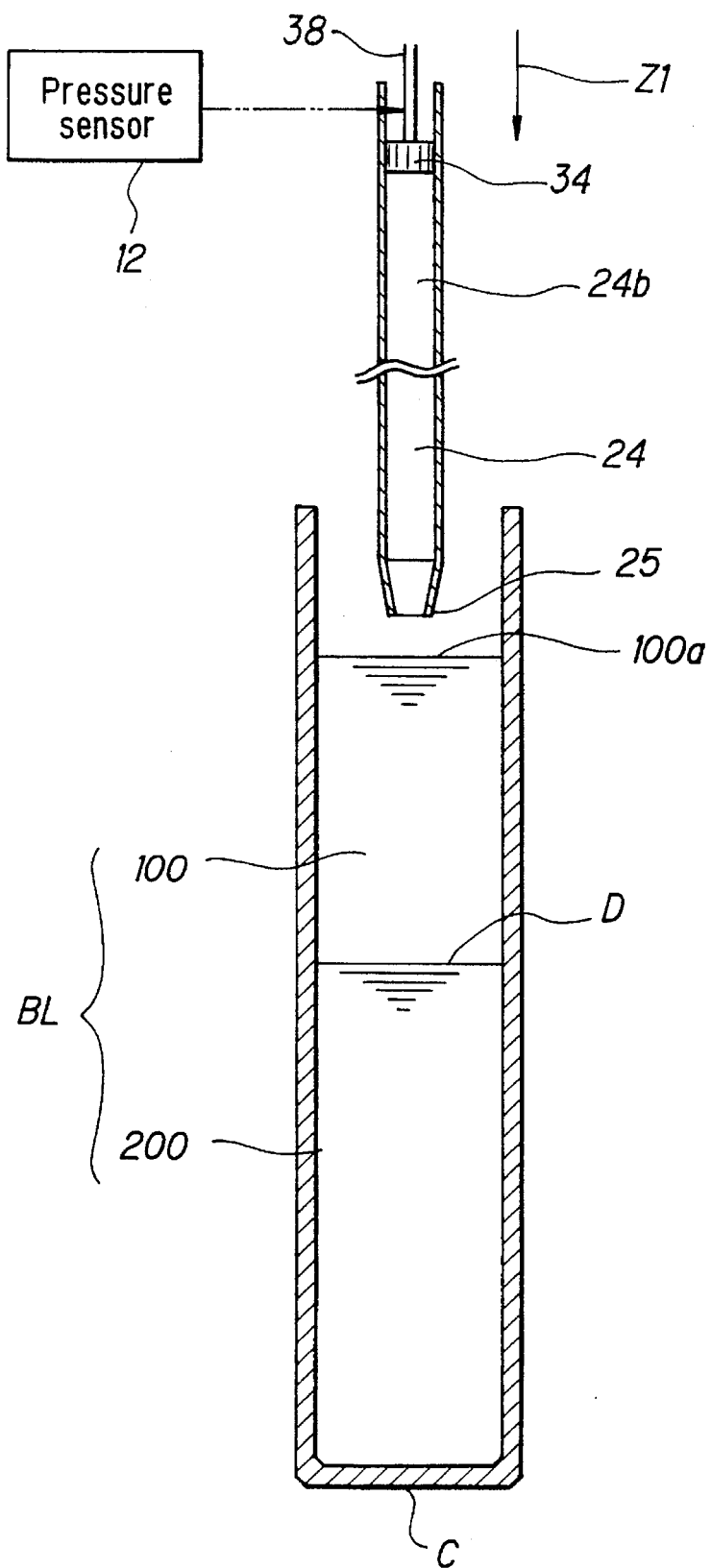
FIG. 8 shows the initial state, i.e., a state before a tube of a sucking device comes into contact with a first liquid layer.

Referring to FIG. 8, blood BL as a separation object liquid is placed in a container C. The blood BL is separated into a first liquid layer 100 and a second liquid layer 200 by centrifugation, for instance. The first liquid layer 100 is also called an upper liquid layer or a supernatant liquid (including serum etc.). The second liquid layer 200, which is called a lower liquid layer, includes blood plasma, a blood clot, a separating agent, etc. and is relatively close to a solid.

In this manner, first, the blood BL is rendered into a separated state, i.e., separated into the first liquid layer 100 and the second liquid layer 200 by utilizing differences in specific gravity, for instance. A liquid boundary surface D exists between the first liquid layer 100 and the second liquid layer 200.

In FIG. 8, only part of the tube 24 (also called a tip) is shown. The member 34 is located in the tube 24. The pressure sensor 12 is coupled to the air tube 38, which is connected to the member 34. The air tube 38 communicates with a hollow portion 24b of the tube 24, and the pressure sensor 12 can detect both of the pressure inside the hollow portion 24b and the pressure inside the air tube 38.

First, referring to FIGS. 8 and 9, a description will be made of how to detect the position of a top surface 100a of the first liquid layer 100. A process of detecting the position of the top surface 100a of the first liquid layer 100 are shown as steps S1–S5 of a flowchart of FIG. 14.

In the initial state, the tip opening 25 of the tube 24 is located upward and kept away from the first liquid layer 100, i.e., escaped (step S1).

In step S2, the container C (see FIG. 8) is placed at a predetermined position under the sucking device 10 (see FIG. 5).

Referring to FIG. 5, the controller 18 causes the motor 70 to operate to move the first block body 47 in the direction Z1 (downward) of arrow Z together with the belt 62. As a result, the second block bodies 49 and the third block bodies 53, which are placed on the first block body 47, are together moved in the downward direction of arrow Z along the common straight rail R.

Figure 9:
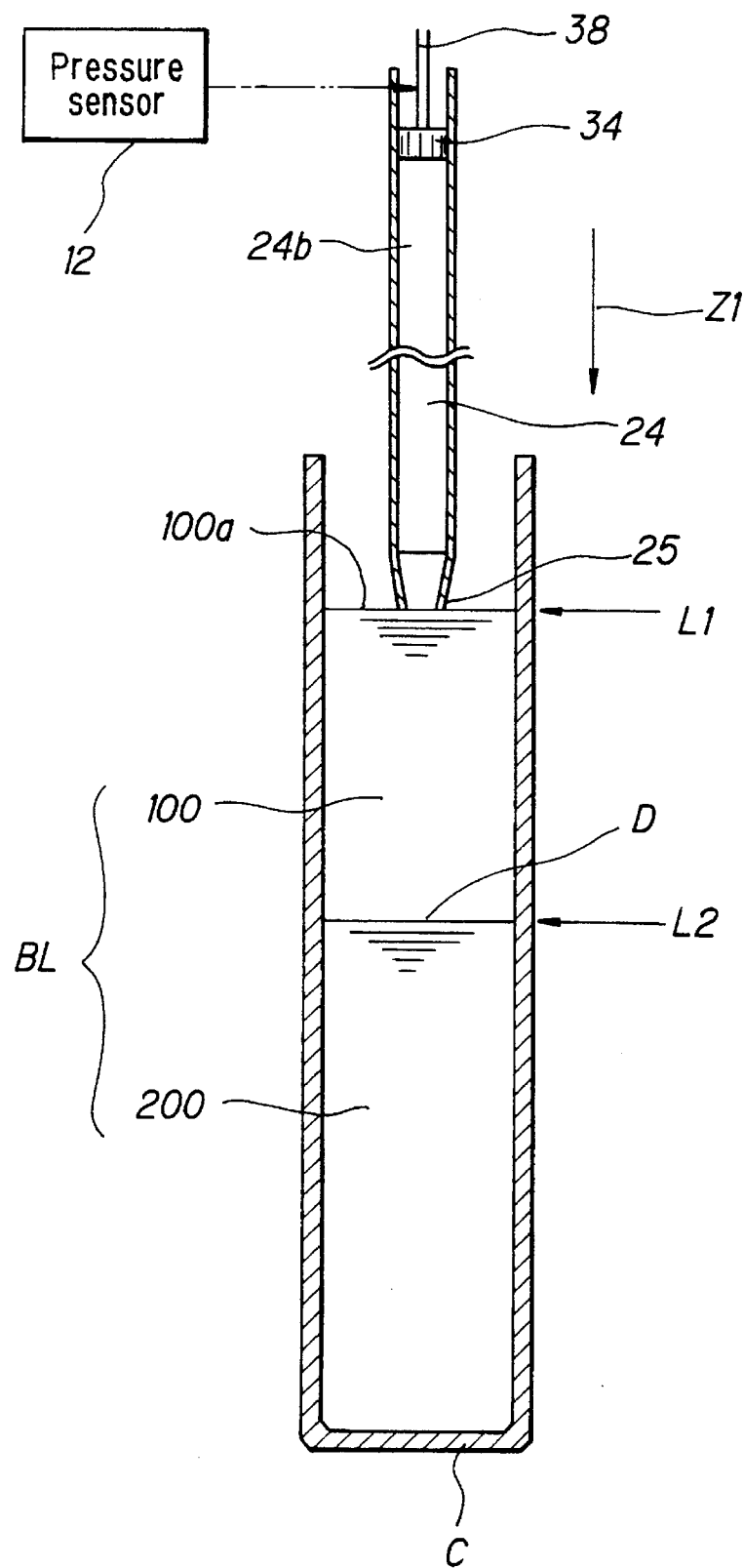
FIG. 9 shows a state in which the tip of the tube is in contact with the top surface of the first liquid layer.

In step S3, as shown in FIG. 9, the tip opening 25 of the tube 24 comes into contact with the top surface 100a of the first liquid layer 100.

As shown in FIG. 9, if the tip opening 25 enters the first liquid layer 100 even only slightly through its top surface 100a, the internal pressure of the hollow portion 24b of the tube 24 and the air tube 38 is increased (to a first pressure). This pressure change is detected by the pressure sensor 12.

In step S4 (see FIG. 14), based on a pressure signal S2 (see FIG. 6) produced by the pressure sensor 12, the controller 18 judges whether the pressure of the air tube 38 (see FIG. 9) has changed.

If the controller 18 Judges that the pressure has changed, it stores the position of the tip opening 25 of the tube 24 as a first position L1 (step S5), which means the position at which the tip opening 25 has reached the top surface 100a of the first liquid layer 100.

Next, a description will be made of the method for detecting the position, i.e., a second position L2, of the boundary surface D between the first liquid layer 100 and the second liquid layer 200 by the liquid boundary detecting apparatus 90. A process of detecting the second position L2 is shown in steps S6–S10 of FIG. 14.

In step S6, referring to FIG. 5, the controller 18 further causes the motor 70 to operate to thereby move the first block body 47 in the downward direction of arrow Z together with the belt 62. Also in this case, the second block bodies 49 and the third block bodies 53 move downward following the first block body 47.

Then, by causing the motor 30 (see FIG. 5) to operate, the controller 18 causes the member 44 to move slightly in the downward direction of arrow Z together with the nut 42. That is, the piston 28 is slightly moved downward with respect to the cylinder 26.

As a result, as shown in FIG. 10, air is sightly pushed out from the hollow portion 24b of the tube 24 that communicates with the air tube 38 of the air bubble generating device 20 through the tip opening 25, to an air bubble B in the first liquid layer 100 (step S7).

Figure 11:
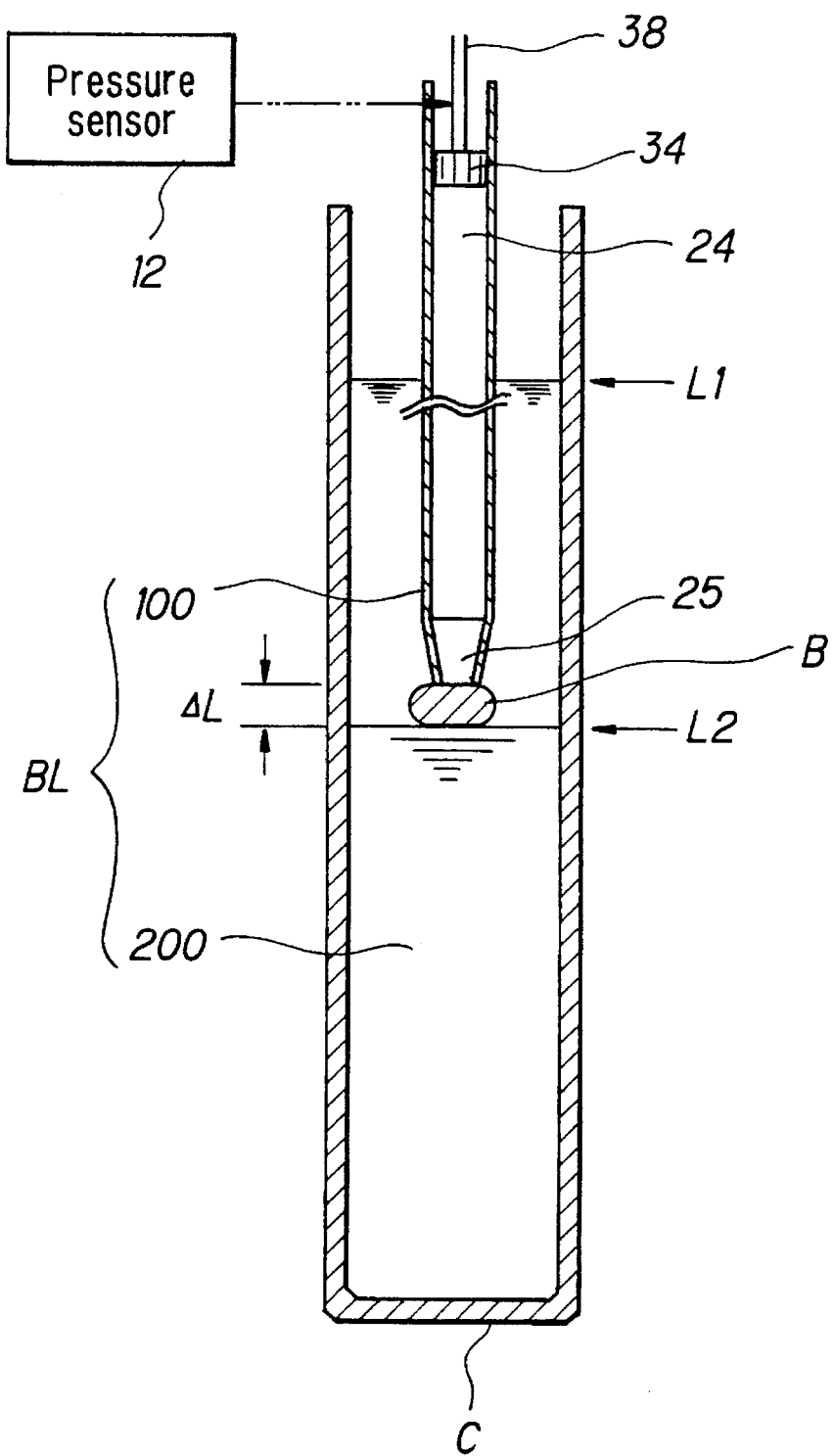
FIG. 11 shows a state in which the air bubble has reached a boundary surface D.

In step S8, referring to FIG. 5, the controller 28 instructs the motor 70 to further move downward the first block body 47 together with the belt 26. As the tube 24 proceeds through the first liquid layer 100, the internal pressure of the tube 24 gradually increases. In this operation, preferably, the size of the air bubble B is so adjusted as not to be reduced by the pressure increase. As shown in FIG. 11, the bottom of the air bubble B of the tube 24 reaches the boundary surface D.

When the bottom of the air bubble B of the tube 24 reaches the boundary surface D in the above manner, the air bubble B received pressure from the second liquid layer 200 and the internal pressure of the tube 24 increases quickly (to a second pressure).

In step S9, the pressure sensor 12 detects the quick change of the internal pressure of the hollow portion 24b of the tube 24 and the air tube 38, and sends a pressure signal S2 to the controller 18 (see FIG. 6).

If the controller 18 judges based on the pressure signal S2 that the internal pressure of the hollow portion 24b of the tube 24 has changed, it stores a second position (boundary position) L2 as a position at which the bottom of the air bubble B comes into contact with the top surface of the second liquid layer 200, i.e., the boundary surface D (step S10).

In this case, as shown in FIG. 11, the position of the tip opening 25 is higher than the second position L2 by a thickness ΔL of the air bubble B in the Z-direction. Therefore, during the entire operation the tip opening 25 does not touch the second liquid layer 200; in other words, it is not contaminated.

By the way, the controller 18 controls the drive of the motor 70 based on, for instance, a signal sent from a rotary encoder (not shown) that is attached to the motor 70. Since the tube 24 is moved by the motor 70, the controller 18 can identify the first position L1 and the second position L2 (see FIG. 11) by receiving outputs of the rotary encoder when the tube 24 is located at the positions L1 and L2, respectively.

In step S11, referring to FIG. 5, the controller 28 reverses the motor 70 by supplying it with a proper command. As a result, the first block body 47 as well as the second block bodies 49 and the third block bodies 53 is moved in the upward direction of arrow Z and approximately returned to the position shown in FIG. 9. That is, the tip opening 25 of the tube 24 is raised approximately to the first position L1, i.e., the top surface 100a of the first liquid layer 100.

Then, referring to FIG. 5, while causing the motor 70 to operate to move the tube 24 in the direction Z1 (downward), the controller 18 causes the motor 30 to operate to raise the piston 28 with respect to cylinder 26 of the pressure reducing device 20 that also serves as the air bubble generating device.

In this operation, referring to FIG. 5, the controller 28 instructs the motor 70 to lower the first block body 47 in the direction Z1 together with the belt 62. As the first block body 47 is lowered, the second block bodies 49 and the third block bodies 53 are also lowered. On the other hand, by causing the motor 30 to operate, the piston 28 is moved in the Z2 direction (upward) to reduce the internal pressure of the hollow portion 24b of the tube 24 and the air tube 38.

Figure 12:
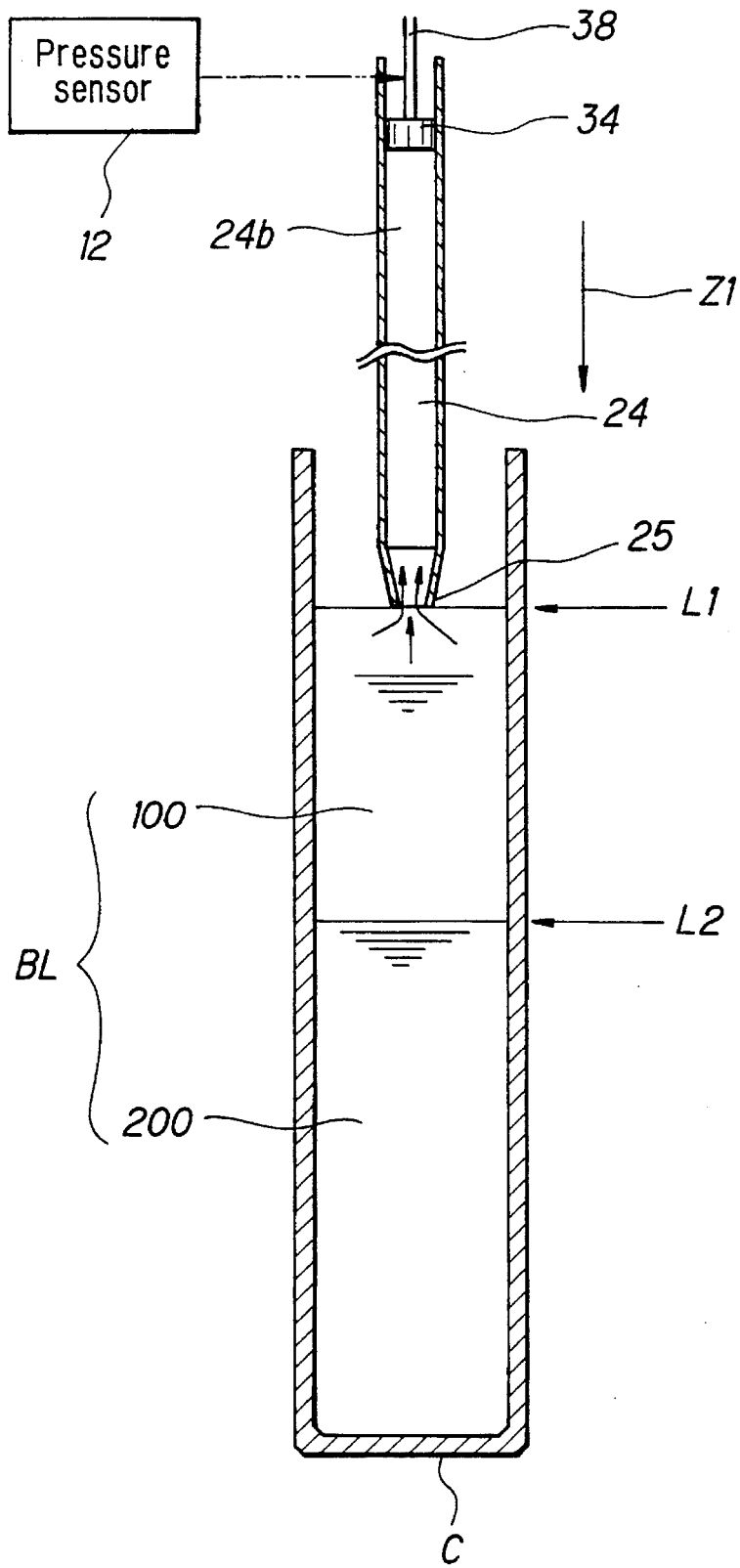
FIG. 12 shows a state in which the tube starts to suck up the first liquid.

Due to this pressure reduction, the first liquid 100 is sucked into the hollow portion 24b of the tube 24 as indicated by arrows in FIG. 12 (step S12).

Figure 13:
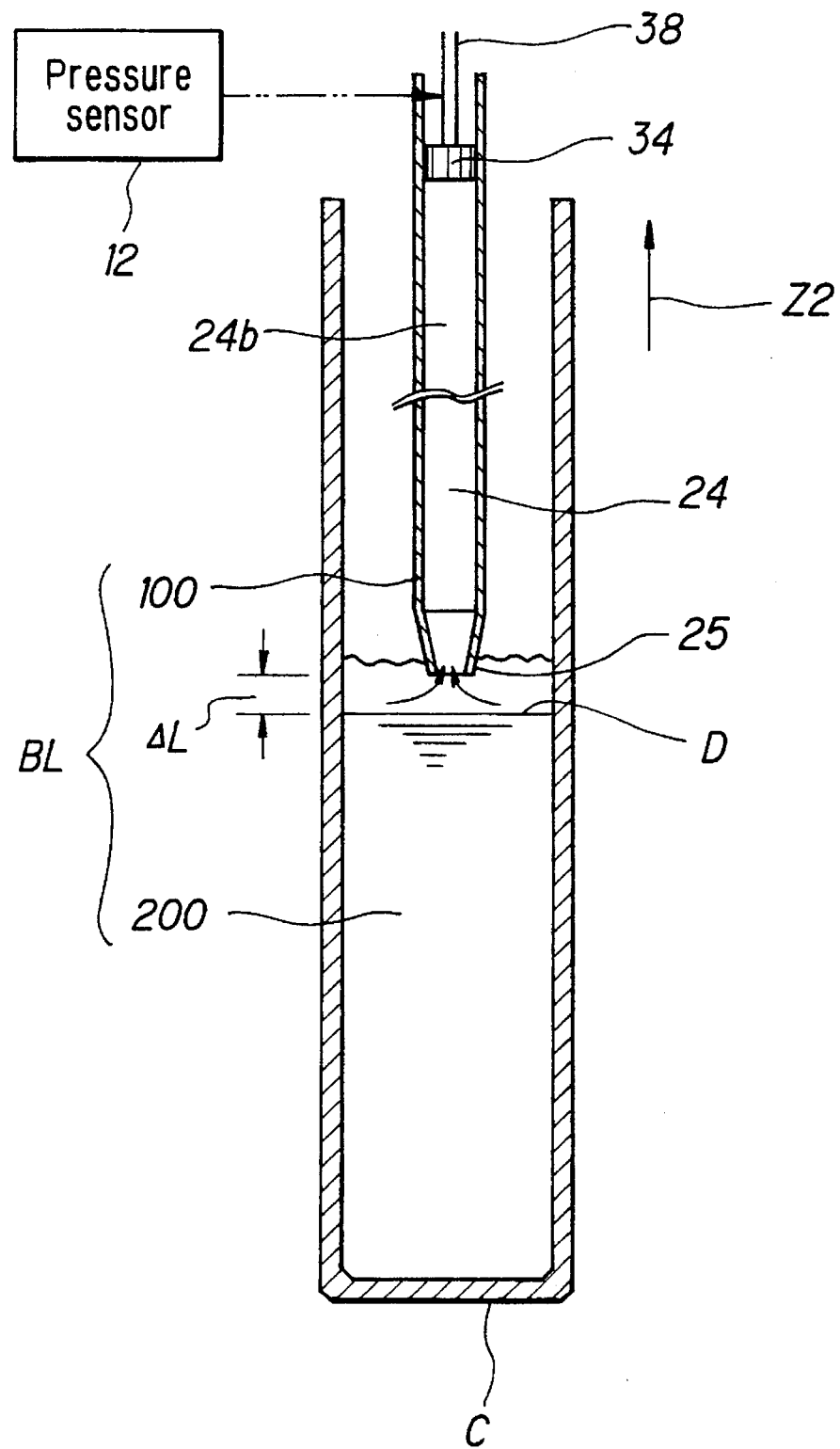
FIG. 13 shows a state in which almost all the first liquid has been sucked up.

In this manner, as shown in FIG. 13, almost all the first liquid 100 is sucked up and the tip opening 25 of the tube 24 approaches the boundary surface D. When the tip opening 25 has approximately reached the second position L2, the controller 28 stops the motor 70 (step S13).

In the above manner, the first liquid 100, for instance, blood serum can be positively sucked up separately from the second liquid layer 200. Further, since the tip opening 25 of the tube 24 does not come into contact with the boundary surface D, it is not contaminated by the second liquid 200.

By the way, the first liquid 100 that has been separated and sucked up by the tube 24 (also called the tip) in the above manner is placed in a separately provided container. The first liquid is introduced into the container after the tube 24 is brought close to the bottom of the container while the controller 18 controls the motor 70 and other components (see FIG. 5). This is to improve the accuracy of detecting the amount of the first liquid 100.

Figure 7:
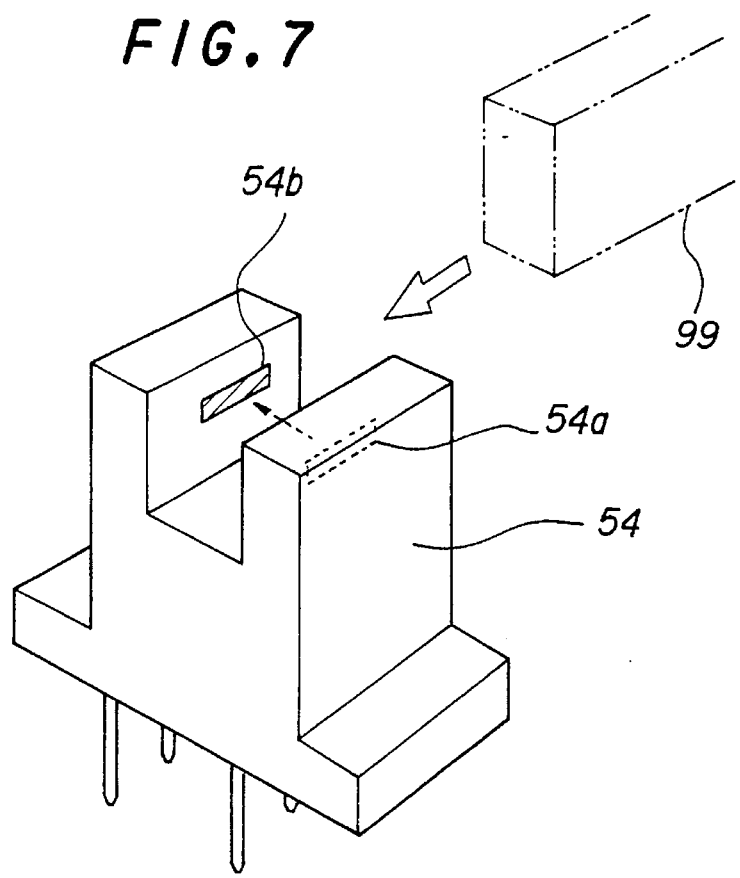
FIG. 7 is a perspective view showing an example of a contact-with-obstacle detecting sensor.

If the tip opening 24 comes into contact with the bottom of the container in the above operation, the interrupting portion 99, which is integral with the first block body 47, interrupts the light coming from the projector 54 (see FIG. 7). As a result, a contact-with-obstacle detection signal S1 is supplied from the sensor 54 to the controller 18 (see FIG. 6). Based on the signal S1, the controller 18 immediately stops the motor 70. By using the embodiment of the invention, the operation of separating and sucking up a liquid layer can be automatized easily.

Since the first to third block bodies 47, 49 and 53 are linearly guided alone the single, common straight fall R, the linearity between the movements of those block bodies can be made high.

The invention is not limited to the above embodiment, as exemplified below.

Although in the above embodiment the object liquid to be separated and sucked up is assumed to be a body liquid, particularly blood, the invention is not limited to such a case but can apparently be applied to the separation of liquids in other domains or fields.

Although the above embodiment is directed to the separation of two liquid layers, the invention can also be applied to the separation of three or more liquid layers.

A linear motor may used instead of the combination of the rotary motor 70 and the belt 62 and pulleys 64 and 66 for converting the rotational operation of the motor 70 to a linear movement.

A linear motor may be used instead of the combination of the motor 30 and the ball screw 40 for converting the rotational operation of the motor 30 to a linear movement.

As described above, according to the invention, a first liquid layer of a liquid to be separated such as a body liquid can be positively removed from a second liquid thereof without any possibility of contamination or a change in quality of the liquid.

What is claimed is:

1. A method for detecting a position of a boundary between a first liquid layer and a second liquid layer that is different from the first liquid layer, comprising the steps of:

generating an air bubble on and in fluid communication with a prescribed member in the first liquid;

moving the prescribed member toward the second liquid layer while the prescribed member keeps retaining the air bubble;

detecting a pressure change within the prescribed member that occurs when the air bubble reaches the boundary position; and detecting the boundary position based on a position of the prescribed member at a time point when the pressure change is detected.

2. The method according to claim 1, wherein the air bubble is generated at a tip of the prescribed member.

3. The method according to claim 1, wherein the first liquid layer is a supernatant liquid.

4. The method according to claim 1, wherein the first and second liquid layers are a body liquid.

5. A method for removing a first liquid layer from a second liquid layer that is different from the first liquid layer, comprising the steps of:

inserting, into the first liquid layer, means for sucking a liquid of the first liquid layer;

generating an air bubble on and in fluid communication with the sucking means located in the first liquid layer;

moving the sucking means toward the second liquid layer while the sucking means keeps retaining the air bubble;

detecting a pressure change within the sucking means;

moving the sucking means to a prescribed position; and causing the sucking means to suck the liquid of the first liquid layer while moving the sucking means from the prescribed position approximately to a position where the pressure change was detected.

6. The method according to claim 5, wherein the air bubble is generated at a tip of the sucking means.

7. The method according to claim 5, wherein the first liquid layer is a supernatant liquid.

8. The method according to claim 5, wherein the first and second liquid layers are a body liquid.

9. The method according to claim 5, further comprising the steps of:

moving the sucking means from a position that is distant from the first liquid layer toward the first liquid layer; and detecting a second pressure change within the sucking means, wherein the prescribed position is approximately equal to a position where the second pressure change is detected.

10. An apparatus for use in detecting a position of a boundary between a first liquid layer and a second liquid layer that is different from the first liquid layer, comprising:

means for generating an air bubble on and in fluid communication with a prescribed member in the first liquid;

means for moving the prescribed member toward the second liquid layer;

means for controlling operation of the generating means and the moving means such that the prescribed member retains the air bubble while the prescribed member is moved toward the second liquid layer;

means for detecting a pressure change within the prescribed member that occurs when the air bubble reaches the boundary position; and means for detecting the boundary position based on a position of the prescribed member at a time point when the pressure change is detected.

11. The apparatus according to claim 10, wherein the means for generating comprises means for generating the air bubble at a tip of the prescribed means.

12. The apparatus according to claim 10, wherein the prescribed member comprises a tube and means for controlling a pressure within the tube.

13. An apparatus for removing a first liquid layer from a second liquid layer that is different from the first liquid layer, comprising:

sucking means for generating an air bubble on and in fluid communication with the sucking means, retaining the generated air bubble, and sucking a liquid of the first liquid layer;

means for moving the sucking means;

means for detecting pressure changes within the sucking means; and means for controlling the operation of the sucking means, the detecting means and the moving means such that the sucking means retains the air bubble while the sucking means is moved toward the second liquid layer and the detecting means is operative and such that the sucking means sucks the liquid of the first liquid layer while the sucking means is moved through the first liquid layer based on at least one position of the sucking means at a time point when at least one pressure change was detected.

14. The apparatus according to claim 13, wherein the pressure change detecting means comprises means for detecting a first pressure change that occurs when the sucking means enters the first liquid layer from outside of the first liquid layer, and a second pressure change that occurs when the air bubble retained by the sucking means reaches the second liquid layer from the first liquid layer, and wherein the moving means comprises means for moving the sucking means from a first position that approximately corresponds to a time point when the first pressure change was detected to a second position that approximately corresponds to a time point when the second pressure change was detected during a period when the sucking means sucks the liquid of the first liquid layer.

15. The apparatus according to claim 13, wherein the sucking means comprises means for generating the air bubble at a tip of the sucking means.

16. The apparatus according to claim 13, wherein the sucking means comprises a tube and means for controlling a pressure within the tube.

* * * * *